United States Patent [19]
Armstrong

[11] Patent Number: 5,336,061
[45] Date of Patent: Aug. 9, 1994

[54] SOLAR POWERED RELATIVELY BALANCED PUMPING SYSTEM

[76] Inventor: William P. Armstrong, 7311 Barrington Ct., Wichita, Kans. 67212

[21] Appl. No.: 6,646

[22] Filed: Jan. 21, 1993

[51] Int. Cl.⁵ .............................................. F04B 35/04
[52] U.S. Cl. ..................................... 417/411; 417/415
[58] Field of Search .............................. 417/411, 415

[56] References Cited

U.S. PATENT DOCUMENTS

| | | |
|---|---|---|
| 1,053,525 | 2/1913 | Meklensek . |
| 2,238,692 | 4/1941 | Gage .................... 103/188 |
| 4,586,879 | 5/1986 | Slater .................... 417/411 |
| 4,651,582 | 5/1987 | Bender .................. 417/415 |
| 4,744,334 | 5/1988 | McAnally .............. 417/411 |
| 5,105,671 | 4/1992 | Slater .................... 417/411 |

Primary Examiner—Richard A. Bertsch
Assistant Examiner—Alfred Basichas
Attorney, Agent, or Firm—Kenneth A. Roddy

[57] ABSTRACT

A solar powered pumping system has a ground level walking beam pumping unit and a downhole pump unit which pump liquids during daylight hours. The walking beam pumping unit has a solar powered electric motor which drives a flywheel through drive wheels and a centrifugal clutch to pivot a fulcrum beam having counterweights at one end. The other end of the fulcrum beam is connected by a lift wire to the downhole pump. The downhole pump has a pump housing with a stationary check valve at its upper end connected to a supply conduit extending to the surface. A traveling check valve/piston inside the pump housing is moved on the up stroke by a lift rod slidably mounted on the exterior of the housing which has a top end connected to the lift wire and a lower end connected to the traveling check valve/piston through a longitudinal slot in the lower housing. The traveling check valve/piston is returned on the down stroke by a tension return spring connected between the traveling check valve/piston and the pump housing. On the down stroke the traveling check valve opens and the stationary check valve at the top of the pump housing closes allowing liquid to enter. On the up stroke the traveling check valve closes, the stationary check valve opens, and the traveling check valve/piston lifts or pushes the liquid through the stationary check valve and subsequently to the surface. The return spring and counterweights produce a relatively balanced load condition to reduce power consumption and increase operating efficiency.

17 Claims, 3 Drawing Sheets

SOLAR POWERED RELATIVELY BALANCED PUMPING SYSTEM

BACKGROUND OF THE INVENTION

1. Field of the Invention

This invention relates generally to solar powered pumping systems, and more particularly to a solar powered relatively balanced pumping system having a ground level electric driven pumping unit with counterbalance weights and a downhole pump with a return spring which provides a relatively balanced system between the total weight of the liquid column being lifted, the return spring torque, the counter balance weight, and a minimum powered DC motor to activate the pumping cycle.

2. Brief Description of the Prior Art

Conventional sucker rod pumping units have a gasoline motor driven "walking beam" which has a rotating flywheel and an oscillating arm having a curved head cable track at the outer end which moves up and down. A cable connected to the walking beam passes over the cable track and is connected at its lower end to a sucker rod. The sucker rod passes through a packer seal, down through the supply conduit and is connected at its lower end to a downhole pump which is disposed inside a well casing beneath the water table. The conventional sucker rod pump is a tubular member with a fixed "foot valve" (check valve) at the lower end. A piston is connected to the reciprocating sucker rod and travels up and down in the tubular pump housing and separates the housing into an upper chamber above the piston and a lower chamber below the piston. The piston also contains a check valve. On the up stroke of the sucker rod, the upper check valve in the piston closes and the lower check valve (foot valve) opens and water or oil is "sucked" up into the lower chamber of the pump housing. On the down stroke, the piston moves through the liquid in the lower chamber, the upper check valve in the piston opens and the lower check valve (foot valve) closes, and water or oil is now above the piston. On successive up strokes, the water is transported to the surface.

Solar powered pumping units are known wherein the gasoline engine is replaced by an electric motor coupled with photovoltaic cells for collecting electrical energy which is used to energize the above ground pumping unit or to power an electric downhole pump.

The up and down reciprocating motion of conventional pumping systems driven by solar, electric motor, or gasoline engine powered units requires the drive system to generate a given amount of torque force to activate the downhole pump. The depth of the well and the amount of head pressure as a result of the weight of the liquid column being pumped must be overcome by the force generated by the motor. The maximum amount of lift force required to be generated is on the up stroke and the minimum force is on the down stroke. Thus, the forces required to be overcome by the drive motor is not constant, but instead is unbalanced throughout each cycle. This unbalanced torque requirement labors the drive motor and results in shortened motor life. Starting the motor in an unbalanced or loaded condition will often result in motor stall or burnout. Increasing the size or output of the motor increases power consumption and decreases operating efficiency.

Another problem with conventional downhole reciprocating pumps is that the pump piston is connected to the walking beam or fulcrum beam by a sucker rod which is coaxial with the discharge conduit and passes through a packer seal or stuffing box arrangement at ground level. This stuffing box seal is subject to leakage and failure and must be replaced often. The reciprocating motion of the sucker rod inside the discharge conduit can, through friction, rub against the conduit lining and cause eventual failure.

There are several patents which disclose various ground level pumping units and downhole pumps.

Slater, U.S. Pat. No. 4,586,879 discloses a solar powered rotary wheel pumping unit with cable connections through a system of pulleys to a conventional downhole reciprocating pump and has an adjustable stroke. The pump unit is described as operating in a conventional manner, thus a piston containing a check valve is connected to the lower end of the pump rod and on the up stroke of the pump rod, the valve in the piston closes and a lower check valve (foot valve) opens and liquid is sucked up into the pump housing. On the down or return stroke, the piston moves through the liquid in the housing. Slater provides a compression spring at the top end of the pump rod which is compressed when the pump rod moves upwardly (suction stroke) and aids in the down stroke of the pump rod (piston return through liquid) and also reduces shock on the pump rod and other components. The pump must rely on the total weight of the sucker rod created by gravity for the return of the piston to the beginning of the cycle. Slater provides spring assist on the unloaded down stroke, but makes no provision for balance between the loaded up stroke and the unloaded down stroke.

Allen, U.S. Pat. No. 4,681,515 discloses a solar powered walking beam pumping unit for use with downhole reciprocating pumps which has three motors and a self-adjusting counterweight which is extended inwardly or outwardly relative to one end of the walking beam by a rotating threaded shaft driven by one of the motors. There is also an element of inefficiency through the power consumption of the motors and a potential for failure where each is dependent upon the other.

McAnally, U.S. Pat. No. 4,744,334 discloses a solar powered oscillating pumpjack beam pumping unit and reservoir combination connected through a packer seal to a downhole reciprocating sucker rod pump. McAnally teaches a container at the outer end of the pumpjack beam into which counterweights may be added or removed to adjust pump efficiency, but offers no balance between the loaded up stroke and the unloaded down stroke. There is no provision other than gravity or shear motor torque for returning the sucker rod at the end of the lift cycle.

Gage, U.S. Pat. No. 2,238,692 and Meklensek, U.S. Pat. No. 1,053,525 discloses downhole reciprocating pumps driven by conventional electric motors which have a fixed check valve at the top of the barrel and a traveling check valve at the lower end which is reciprocated with lift rods exterior of the pump housing. There is no provision for solar power or balance between the loaded up stroke and the unloaded down stroke or for returning the sucker rod at the end of the lift cycle other than by gravity or shear motor torque.

The present invention is distinguished over the prior art in general, and these patents in particular by a solar powered pumping system having a ground level walking beam pumping unit and a downhole pump unit. The walking beam pumping unit has a solar powered electric motor which drives a flywheel through drive wheels and a centrifugal clutch to pivot a fulcrum beam having counterweights at one end. The other end of the fulcrum beam is connected by a lift wire to the downhole pump. The downhole pump has a pump housing with a stationary check valve at its upper end connected to a supply conduit extending to the surface. A traveling check valve/piston inside the pump housing is moved on the up stroke by a lift rod slidably mounted on the exterior of the housing which has a top end connected to the lift wire and a lower end connected to the traveling check valve/piston through a longitudinal slot in the lower housing. The traveling check valve/piston is returned on the down stroke by a tension return spring connected between the traveling check valve/piston and the pump housing. On the down stroke the traveling check valve opens and the stationary check valve at the top of the pump housing closes allowing liquid to enter. On the up stroke the traveling check valve closes, the stationary check valve opens, and the traveling check valve/piston lifts or pushes the liquid through the stationary check valve and subsequently to the surface. The return spring and counterweights produce a relatively balanced load condition to reduce power consumption and increase operating efficiency.

SUMMARY OF THE INVENTION

It is therefore an object of this invention to provide a method for creating relatively balanced torque requirements for the electric drive motor in electric powered pumping systems.

It is another object of the present invention to provide a solar powered relatively balanced pumping system which is self contained and will operate automatically during daylight hours.

Another object of this invention to provide a solar powered relatively balanced pumping system which has an above ground pumping unit with a counterbalanced pump drive and a downhole pump unit with a return spring connected to the traveling piston wherein the system operates under a fairly constant balanced load condition through each cycle.

Another object of this invention is to provide a solar powered relatively balanced pumping system which does not require a stuffing box or packer seal arrangement through the discharge conduit at ground level and further allows the fluid to be pumped directly to an elevated holding tank without the need for auxiliary lift pumps.

Another object of this invention is to provide a solar powered relatively balanced pumping system which has a relatively balanced torque requirement to reduce stress on the drive motor and extend the life of the motor.

Another object of this invention is to provide a solar powered relatively balanced pumping system which allows the drive motor to start in an unloaded condition and engage a drive wheel as it reaches optimum operating speed to reduce the likelihood of motor stall or burn-out.

Another object of this invention is to provide a solar powered relatively balanced pumping system wherein the walking beam or fulcrum beam can be easily disconnected from the flywheel and operated by hand in cases of emergency.

Another object of this invention is to provide a solar powered relatively balanced pumping system which can be employed as a replacement of existing sucker rod pumps with an add-on option for a solar pump conversion at some future date.

A further object of this invention is to provide a solar powered relatively balanced pumping system which operates by solar energy in a highly efficient relatively balanced load condition to conserve energy and does not require fuel, connection to electrical utilities, storage batteries, or electrical regulating equipment to pump water.

A still further object of this invention is to provide a solar powered relatively balanced pumping system which is simple in construction, economical to manufacture, and rugged and reliable in use.

Other objects of the invention will become apparent from time to time throughout the specification and claims as hereinafter related.

The above noted objects and other objects of the invention are accomplished by a solar powered pumping system having a ground level walking beam pumping unit and a downhole pump unit. The walking beam pumping unit has a solar powered electric motor which drives a flywheel through drive wheels and a centrifugal clutch to pivot a fulcrum beam having counterweights at one end. The other end of the fulcrum beam is connected by a lift wire to the downhole pump. The downhole pump has a pump housing with a stationary check valve at its upper end connected to a supply conduit extending to the surface. A traveling check valve/piston inside the pump housing is moved on the up stroke by a lift rod slidably mounted on the exterior of the housing which has a top end connected to the lift wire and a lower end connected to the traveling check valve/piston through a longitudinal slot in the lower housing. The traveling check valve/piston is returned on the down stroke by a tension return spring connected between the traveling check valve/piston and the pump housing. On the down stroke the traveling check valve opens and the stationary check valve at the top of the pump housing closes allowing liquid to enter. On the up stroke the traveling check valve closes, the stationary check valve opens, and the traveling check valve/piston lifts or pushes the liquid through the stationary check valve and subsequently to the surface. The return spring and counterweights produce a relatively balanced load condition to reduce power consumption and increase operating efficiency.

DESCRIPTION OF THE PREFERRED EMBODIMENT

Figure 1:
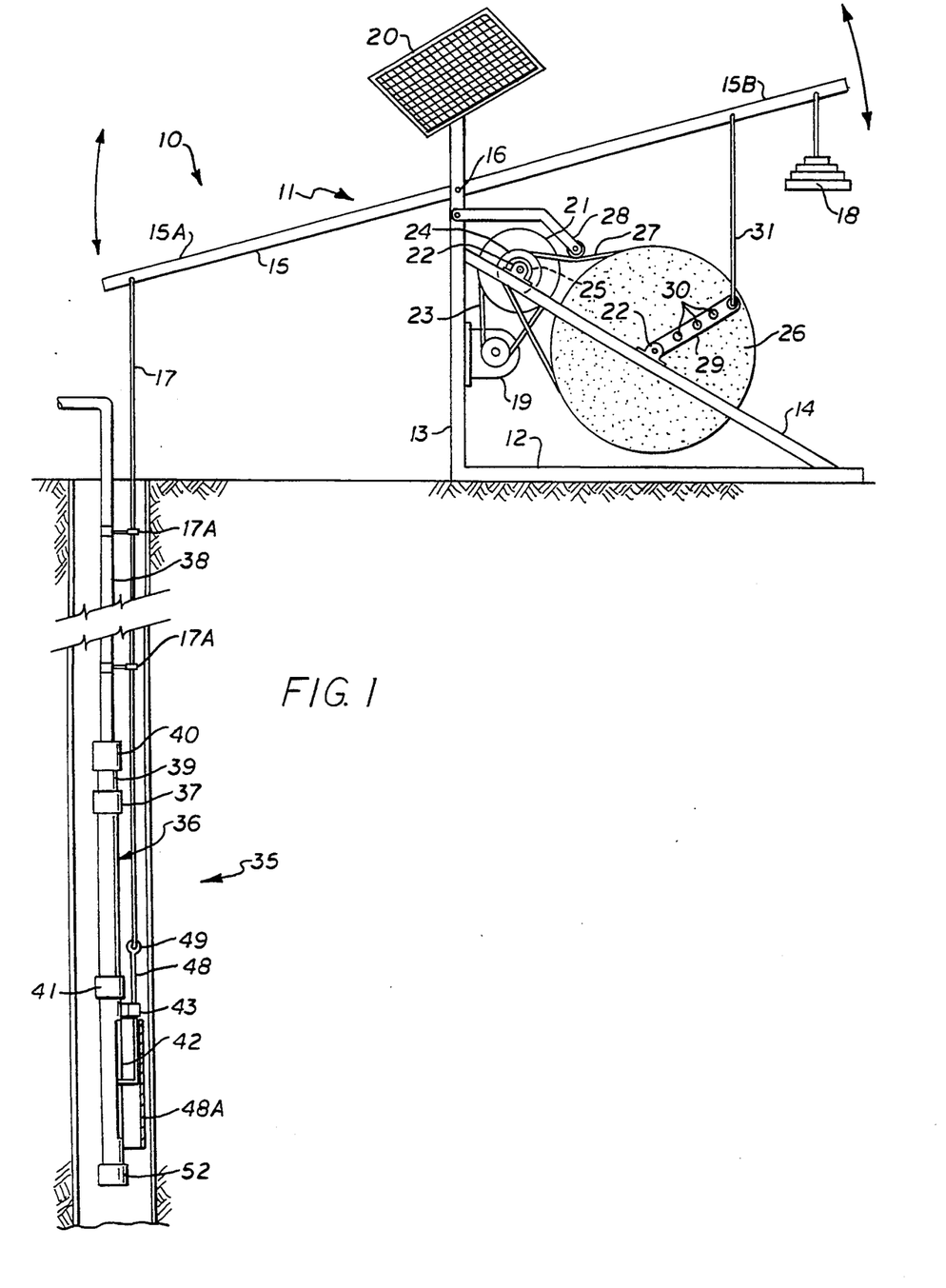
FIG. 1 is a side elevation of the solar powered relatively balanced pumping system in accordance with the present invention.

Referring to the drawings by numerals of reference, there is shown in FIG. 1, a preferred solar powered relatively balanced pumping system 10 which includes a ground level pumping unit 11 and a downhole pump unit 35 for pumping liquids such as water or oil.

The ground level pumping unit 11 has a frame including a base or skid 12 with a vertical beam 13 at one end and a pair of parallel laterally spaced support beams 14 secured diagonally between the skid 12 and vertical beam 13. A walking beam or fulcrum beam 15 is pivotally connected intermediate its ends to the upper end of the vertical beam 13 by a pivot pin 16. A lift cable or stainless steel lift wire 17 is connected at its upper end to one end 15A of the fulcrum beam 15 and a plurality of counterweights 18 are removably suspended from the opposite end 15B of the fulcrum beam. The lower end of the cable 17 is connected through eyelets 17A to the downhole pump unit 35 (described hereinafter). The lift wire 17 is lighter in weight than conventional steel sucker rods. A high efficiency DC electric motor 19 is secured to the frame of the pumping unit 11. A panel of photovoltaic (solar) cells 20 is mounted on the frame of the pumping unit 11 or other convenient location and connected to directly to the motor 19 for generating and supplying electrical energy to the motor. In the preferred embodiment, the cells 20 are connected directly to the motor 19, however, it should be understood that storage batteries may also be installed between the cells 20 and the motor 19.

A rotary drive wheel 21 is rotatably secured to the support beams 14 and jouralled in bearings 22 and connected by a belt 23 to the output pulley of the motor 19. A smaller diameter drive reduction wheel 24 is connected to the drive wheel 21 through a centrifugal clutch 25 such that the drive wheel 24 will not rotate until the motor 19 has reached optimum speed. A larger diameter rotary flywheel wheel 26 is rotatably secured to the support beams 14 in spaced relation to the drive wheel 21 and jouralled in bearings 22. The rotary flywheel 26 is connected by a belt 27 to the drive reduction wheel 24. An adjustable small diameter idler pulley 28 connected to the pumping unit frame is engaged on the belt 27 to maintain tension in the belt.

A rigid strap or connecting arm 29 secured to the flywheel 26 to rotate therewith extends radially outward from the center of rotation of the flywheel and is provided with spaced openings 30. A cable 31 is connected at one end to one of the openings 30 and its other end is connected to the end 15B of the fulcrum beam 15 near the suspended counterweights 18. Thus, the point of connection of the cable 31 can be adjusted radially with respect to the axis of rotation of the flywheel 26.

In a preferred embodiment, the beams of the pumping unit frame are formed of square tubing and the rotary flywheel 26 is formed of concrete. The relatively balanced solar powered pump system may also be operated by hand in cases of emergency by disconnecting the fulcrum beam 15 from the flywheel 26.

Figure 2:
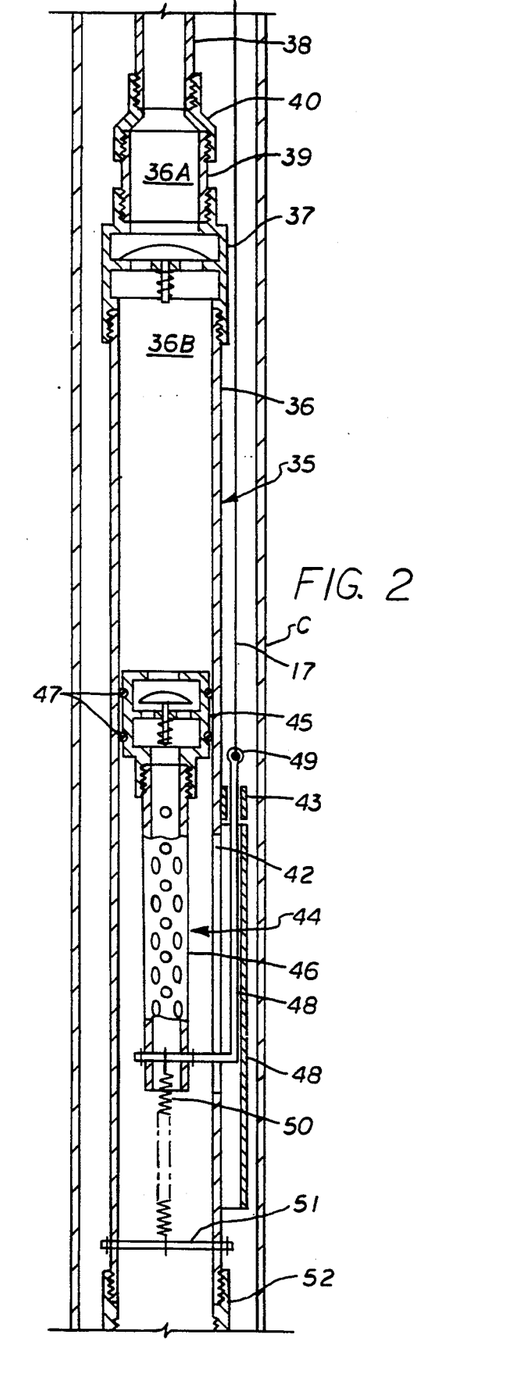
FIG. 2 is longitudinal cross section of the downhole pump unit of the solar powered relatively balanced pumping system shown with the pump piston at the end of the down stroke.
Figure 3:
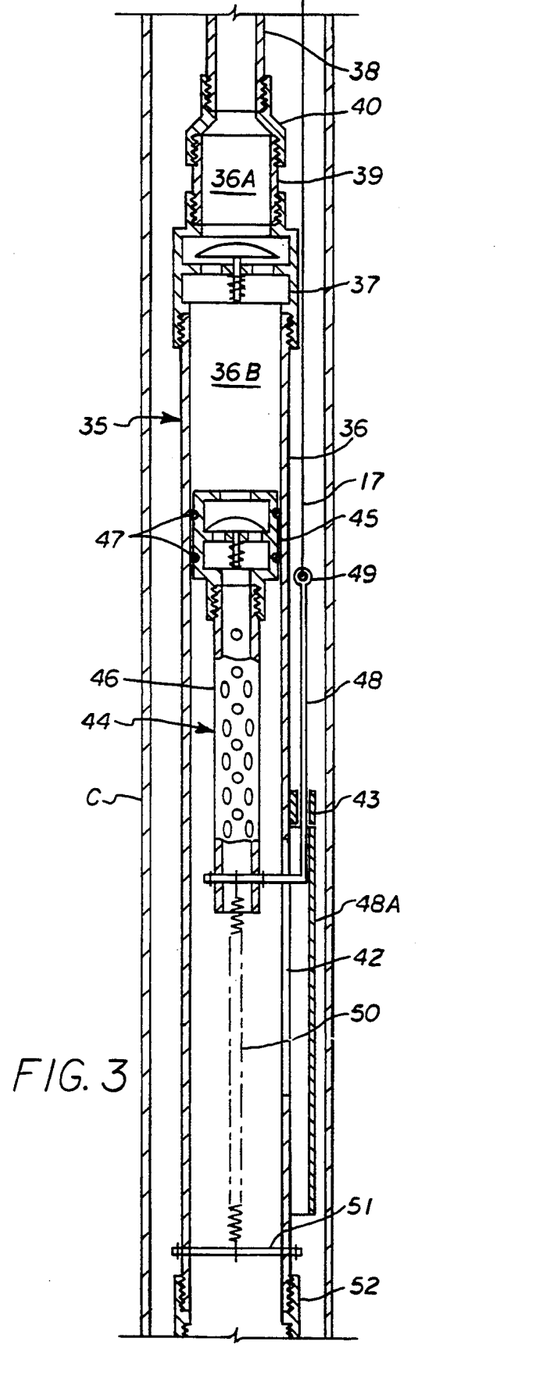
FIG. 3 is longitudinal cross section of the downhole pump unit of the solar powered relatively balanced pumping system shown with the pump piston at the end of the up stroke.

Referring now additionally to FIGS. 2 and 3, the downhole pump unit 35 is positioned inside a well casing C and submerged in the liquid to be pumped. The downhole pump unit 35 has a tubular pump housing 36 with a stationary check valve 37 secured at its upper end. The discharge end (upper end) of the check valve 37 is connected to the lower end of a discharge or supply conduit 38 through a nipple 39 and reducer 40. The discharge or supply conduit extends to the surface. Thus, the stationary check valve 37 at the upper end of the pump housing 36 defines an upper chamber 36A above the valve and a lower chamber 36B below the valve, and the lower chamber 36B serves as the cylinder for the pump unit. The pump housing 36 may be made in tubular sections joined together by a collar 41 (FIG. 1). A longitudinal slot 42 is formed in the sidewall of the lower portion of the tubular pump housing 36. A short small diameter tubular rod guide 43 is connected to the exterior of the pump housing 36 in parallel relation to the pump housing and longitudinal slot 42.

A generally tubular piston assembly 44 is slidably disposed inside the lower portion of the pump housing 36 for reciprocating vertical movement. The piston assembly has a traveling check valve 45 at the upper end and a section of tubing 46 is connected to the intake end (lower end) of the check valve. The check valve 45 moves up and down in the lower chamber 36B above the top of the longitudinal slot 42. The traveling check valve 45 serves as the piston for the pump assembly and has circumferential seals 47 which form a reciprocating sealing relation with the interior of the housing 36. The tubing 46 extends a distance below the check valve 45 and is apertured along its length to facilitate liquid entering the check valve through the interior of the tubing.

An elongate generally L-shaped lift rod 48 is connected to the lower end of the tubing 46. The horizontal portion of the lift rod 48 is secured transversly through the tubing 46, and the vertical portion of the lift rod passes slidably through the rod guide 43 and terminates in an eye 49. The lower end of the lift wire 17 extending from the fulcrum beam 15 passes through eyelets 17A and is connected to the eye 49 of the lift rod 48 (FIG. 1). The lift rod 48 may be slidably enclosed in an outer longitudinal channel member 48A secured to the exterior of the pump housing which extends substantially the length of the longitudinal slot 42.

A tension return spring 50 has one end connected to the lift rod 48 (or lower end of tubing 46) and its other end secured to the lower portion of the pump housing 36. As seen in FIGS. 2 and 3, the return spring 50 may be secured on the interior of the pump housing 36 with its lower end connected to the lower end of the housing 36 by a pin 51 secured transversly through the pump housing. Alternatively, the return spring 50 may also be secured on the exterior of the pump housing 36 with one end connected to the lower end of the 1 i ft rod 48 and its other end connected to the lower end of the pump housing.

FIG. 2 shows the pump assembly at the end of the down stroke. The return spring 50 aids in moving the piston to the down position. On the down stroke of the lift rod 48 and piston assembly 44, the traveling check valve 45 opens and the stationary check valve 37 at the top of the pump housing 36 closes and liquid is allowed to enter the lower chamber 36B through the traveling check valve 45 of the piston assembly.

FIG. 3 shows the pump assembly at the end of the up stroke. The piston assembly 44 is lifted by the lift wire 17 connected between the fulcrum beam 15 and 1 i ft rod 48. On the up stroke, the traveling check valve 45 in the piston assembly 44 closes, the stationary check valve 37 at the upper end of the pump housing 36 opens, and the closed check valve 45 acts as a piston to "lift" or "push" the liquid through the stationary check valve 37 into the upper chamber 36A, rather than being "sucked up" as in conventional sucker rod pumps. On successive up strokes, the liquid is transported through the discharge conduit 38 to the surface.

OPERATION

The panel of photovoltaic cells 20 are connected to the DC motor to operate the pumping system during daylight hours. In operation, the motor 19 is energized and drives the drive wheel 21. When the motor 19 reaches optimum operating speed, the centrifugal clutch 25 engages the smaller reduction drive wheel 24 which then drives the rotary flywheel 26. The end 15B of the fulcrum beam 15 is connected by the cable 31 to the connecting arm 29 which rotates with the flywheel 26. Through 180° of the rotation of the flywheel 26, the rotary motion is converted by the connecting arm 29 into a downward pulling force on the end 15B of the fulcrum beam 15 causing the opposite end 15A of the fulcrum beam to pivot upward about the pivot pin 16. When the end 15A of the fulcrum beam 15 moves upward, it pulls upward on the lift wire 17 connected to the lift rod 48. During the second 180° phase of flywheel rotation, the tension created by the return spring 50 aids the flywheel's inertia rotation back to the beginning of the cycle.

As the flywheel rotates and the fulcrum end 15A moves up and down, the lift wire 17 connected to the lift rod 48 causes the piston assembly 44 to move up and down inside the pump housing 36. The tension spring 50 connected to the lift rod 48 returns the lift rod and piston assembly 44 to the down position on the down stroke (FIG. 2). On the down stroke of the lift rod 48 and piston assembly 44, the traveling check valve 45 opens and the stationary check valve 37 at the top of the pump housing 36 closes and liquid is allowed to enter the lower chamber 36B through the traveling check valve 45 of the piston assembly. On the up stroke (FIG. 3), the traveling check valve 45 in the piston assembly 44 closes, the stationary check valve 37 at the upper end of the pump housing 36 opens, and the closed check valve 45 acts as a piston to "lift" or "push" the liquid through the stationary check valve 37 into the upper chamber 36A, and on successive up strokes, the liquid is transported through the discharge conduit 38 to the surface.

The depth of the well and the amount of head pressure as a result of the weight of the liquid column being pumped must be overcome by the force generated by the motor. The maximum amount of lift force required to be generated is on the up stroke and the minimum force is on the down stroke. The tension spring 50 used in the present invention is selected to have a return force approximately equal to the weight of the liquid column being lifted. The counterweights 18 at the end 15B of the fulcrum beam 15 are adjusted to provide a counterbalance weight equal to approximately 75% of the spring tension force.

Thus, the forces required to be overcome by the drive motor 19 is fairly constant and relatively balanced throughout each cycle. This relatively balanced torque requirement reduces the stress on the drive motor and results in extended motor life. The centrifugal clutch 25 allows the drive motor 19 to start in an unloaded condition and then engage the reduction drive wheel 24 and flywheel 26 as it reaches optimum operating speed and reduces the likelihood of motor stall or burn-out. As the reduction drive wheel 24 rotates the flywheel 26 to pivot the fulcrum beam 15, the upward and downward forces are balanced and aided by the counterweights 18 and the return spring 50, respectively, and the system operates in a relatively balanced load condition which reduces power consumption and increases operating efficiency.

It should be noted that the present pump operation differs from most conventional sucker rod pumps. Most conventional sucker rod pumps provide a fixed check valve at the lower end of the pump housing and the piston containing a traveling check valve is connected to a reciprocating sucker rod coaxial with the pump housing which extends through a stuffing box. On the up stroke of the sucker rod, the traveling check valve in the piston closes and the lower fixed check valve opens and the liquid is "sucked" up into the lower chamber of the pump housing, rather than being lifted. On the down stroke, the piston moves by gravity force through the liquid in the lower chamber, the check valve in the piston opens and the lower check valve closes, and liquid is now captured above the piston. On successive up strokes, the water is transported to the surface. The depth of the well and the amount of head pressure as a result of the weight of the liquid column being pumped must be overcome by the force generated by the motor. The maximum amount of lift force required is on the up stroke to lift the column of liquid and the minimum force is on the down stroke. Thus, the forces required to be overcome by the drive motor is not constant, but instead is unbalanced throughout each cycle.

The following calculations illustrate the efficiency of the present system compared to a conventional sucker rod pumping system utilizing the water column weight forces of a typical 50 foot deep water well with a 1 inch supply conduit.

The weight of the water column is found by:

Length of pipe = 50' × 12" = 600 in.

Area of supply conduit = pi × $R^2$ = (3.14 × $.5^2$) =

.7854 $in^2$ = .7854 × 600 = 471.24 $in^3$

Weight of 50' water column =

471.24 $in^3$ × .036 lbs/$in^3$ = 16.96 lbs in 50' water column.

The additional weight of the sucker rod of conventional system is:

Conventional sucker rod weight=50'×0.668 lbs/ft.=33.4 lbs.

TTL lift weight of sucker rod system=16.96+33.4=50.36 lbs.

The additional weight of the present system stainless steel lift wire and constant force return spring:

Stainless steel lift wire=50'×0.167 lbs/ft.=8.35 lbs.

Constant force return spring=12 lbs.

TTL lift weight present system=16.96+8.35=12=33.31 lbs.

Thus, the total lift weight of a conventional sucker rod system is 50.36 lbs., whereas the total lift weight of the present system is 33.31 lbs.

Figure 4A:
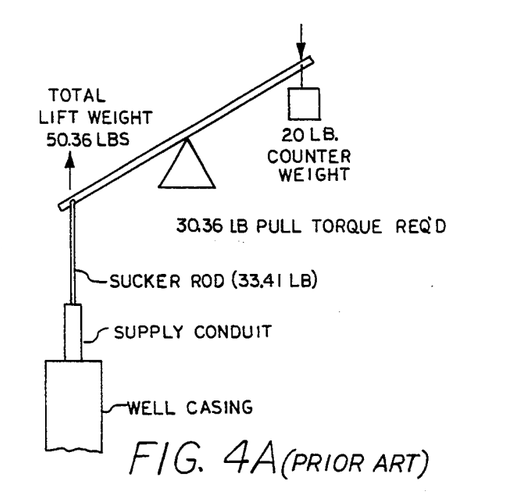
FIGS. 4A and 4B are schematic diagrams illustrating the torque requirements of a conventional sucker rod pumping system in the start of the lift cycle and at the beginning of the return cycle, respectively, based on a typical fifty foot head pressure depth through a one inch supply conduit.
Figure 4B:
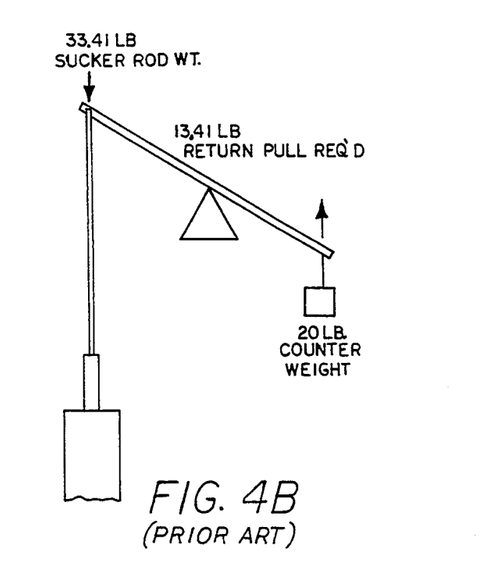
Figure 5A:
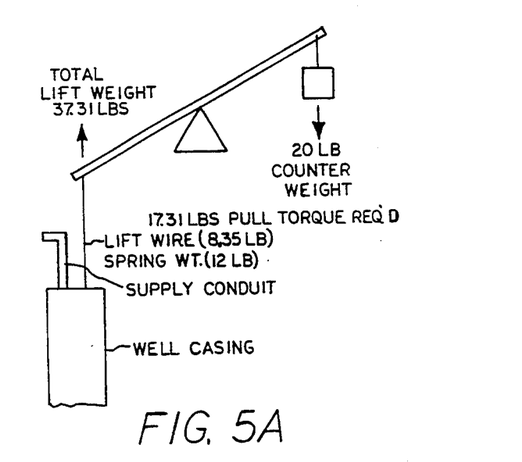
FIGS. 5A and 5B are schematic diagrams illustrating the torque requirements of the present relatively balanced pumping system in the start of the lift cycle and at the beginning of the return cycle, respectively, based on a typical fifty foot head pressure depth through a one inch supply conduit.
Figure 5B:
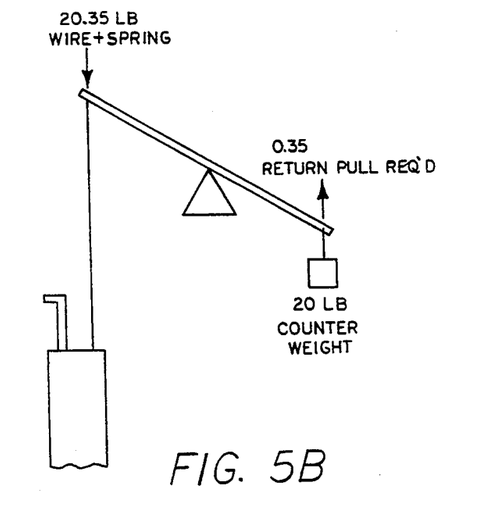

FIGS. 4A and 4B illustrate schematically the torque requirements of a conventional sucker rod pumping system in the start of the lift cycle and at the beginning of the return cycle, respectively. FIGS. 5A and 5B illustrate schematically the torque requirements of the present relatively balanced pumping system in the start of the lift cycle and at the beginning of the return cycle, respectively.

It should be noted that the conventional sucker rod pump must have several pounds of weight (steel rod) above the piston to return it to the beginning of the pumping cycle and it must also overcome the counterbalance as well as resistance created by water flowing through the open check valve as it returns down to the bottom of the pumping cylinder.

The present system, on the other hand, utilizes the minimal weight of the stainless steel lift wire and the aid of the return spring force for this purpose. The return spring and wire weight together must only overcome the counterbalance.

Assuming that a 20 lb counterweight and the same fulcrum point is used in both systems, an obvious difference in the pull torque is required. However, when calculated out, the difference between the amount of force required to pull the fulcrum beam down and the amount of return torque in both system is the same.

However, to begin the cycle, an electric motor with greater "starting torque" is require in the convention sucker rod system than in the present balanced system. This is due to the fact that in the sucker rod system the weight required to force the piston back down through the water resistance will always be greater than that of the present lift wire and return spring arrangement. In other words, the present return spring "pulls" the piston down much quicker.

At the start of the pump lift cycle (FIG. 4A) the conventional sucker rod system using a 20 lb counterweight requires 30.36 lbs of torque to overcome the total lift weight of 50.36 lbs, whereas the present system (FIG. 5A) requires only 17.31 lbs of torque to overcome the lift weight of 37.31 lbs. At the end of the lift cycle and returning to the start position, the conventional lift rod system (FIG. 4B) requires 13.41 lbs of torque to overcome the sucker rod weight of 33.41 lbs, whereas the present system (FIG. 5B) requires only 0.35 lbs of torque to overcome the weight of the lift wire and spring force of 20.35 lbs. Thus, the torque requirement for the conventional sucker rod system cycles between 30.36 lbs. and 13.41 lbs. and the torque requirement for the present system cycles between 17.31 lbs. and 0.35 lbs.

In both systems, the affect of the water column weight is neutralized when the pumps reach the top of the pump cycle. After the check valves close, the water has no more affect on the downward motion of the piston except to create resistance. The sucker rod of the conventional system traveling down inside the supply conduit offers considerable resistance. This is usually overcome by less counterbalance weight. However, pull torque is increased.

The 20 lb. counterbalance weight may be used to offset the water column weight and some motion resistance, however, when the sucker rod returns downward, the velocity is limited by resistance. Whereas, in the present system, the return resistances are minimized and with the aid of inertia created by the pumping unit flywheel and the return spring in the pump, the pump velocity can be maximized. This balance requires less torque and results in higher operating efficiency.

In the above example, the present system used a 50' water column weighing 16.96 lbs and a return spring force of 12 lbs. The return spring force may also be varied for optimum performance in particular applications. For example, in wells down to a 100 foot depth, the optimum performance may be 70% (TTL water column weight×0.70), and in wells in the range of 100' to 200', the optimum performance may be 50%.

The relatively balanced solar powered pump system may also be operated by hand in cases of emergency by disconnecting the fulcrum beam 15 from the flywheel 26.

Because the lift rod is exterior of the discharge conduit, the present system does not require a stuffing box or packer seal arrangement through the discharge conduit at ground level which allows the fluid to be pumped directly to an elevated holding tank without the need for auxiliary lift pumps.

While this invention has been described fully and completely with special emphasis upon a preferred embodiment, it should be understood that within the scope of the appended claims the invention may be practiced otherwise than as specifically described herein.

I claim:

1. An electric powered relatively balanced pumping system having relatively constant and balanced torque requirements for the up and down stroke pump cycle comprising:

a pumping unit at the ground surface including a frame, a longitudinal fulcrum beam pivotally mounted on said frame and having opposed first and second ends, a large diameter flywheel rotatably mounted on said frame and connected with said fulcrum beam for pivoting same, a smaller diameter drive wheel rotatably mounted on said frame and connected with said flywheel for rotating said flywheel, electric motor means operatively connected with said drive wheel and with a source of electrical energy for rotating said drive wheel, a thin steel lift wire connected at an upper end to said fulcrum beam first end and at a lower end to a downhole fluid pump lift rod for moving same in reciprocating movement, and adjustable counterweight means connected at said fulcrum beam second end;

a downhole fluid pump assembly including a pump cylinder having a fluid discharge port at an upper end and a fluid inlet at a lower end, a fluid discharge conduit connected at a lower end to said pump discharge port and extending to the ground surface, a first check valve mounted between said discharge port and said discharge conduit lower end for controlling fluid flow therethrough, a hollow cylindrical piston slidably mounted in said pump cylinder for reciprocating movement relative thereto between an upper position and a lower position, a second check valve mounted in said piston for controlling fluid flow therethrough; and a short lift rod connected at an upper end to said pumping unit lift wire and at a lower end with said piston; and a constant tension return spring connected between said piston and said cylinder for returning said piston to the lower position, the spring tension being a predetermined percentage of the weight of the column of fluid to be lifted by said piston, and said adjustable counterweight means adjusted to provide a counterbalance weight of a predetermined percentage of the spring tension;

upon energization, said motor rotates said drive wheel and said flywheel to move said fulcrum beam first and second ends up and down and said piston is lifted on the up stroke by said lift wire and said short lift rod, the lifting force aided by said counterweight means, and said piston and said short lift rod are returned to the lower position by the force of said tension return spring; and on the down stroke of said piston, said first check valve closes and said second check valve opens to allow fluid to pass through said piston into said pump cylinder and on the up stroke, said first check valve opens and said second check valve closes and the upward movement of said piston forces the fluid in said pump cylinder through said first check valve and into said discharge conduit and on successive up strokes, the fluid is transported through said discharge conduit to the surface;

the tension force of said tension return spring and said counterbalance weight causing the torque forces required to be overcome by said electric motor to be relatively constant and balanced through each up and down stroke of the pump cycle.

2. An electric powered relatively balanced pumping system according to claim 1 including a panel of photovoltaic cells operatively connected with said electric motor for generating and supplying electrical energy to operate said motor, and said electric motor means is a direct current electric motor.

3. An electric powered relatively balanced pumping system according to claim 1 including centrifugal clutch means connected between said electric motor and said drive wheel such that said drive wheel will not rotate until said motor has reached optimum speed to allow said motor to start in an unloaded condition and then engage said drive wheel as it reaches optimum operating speed.

4. An electric powered relatively balanced pumping system according to claim 1 in which said flywheel is formed of concrete.

5. An electric powered relatively balanced pumping system according to claim 1 in which said drive wheel is connected to said motor by a first belt and said drive wheel has a smaller diameter drive reduction wheel connected therewith through a centrifugal clutch and said flywheel is connected by a second belt to said drive reduction wheel, and an idler pulley connected to said frame and engaged on said second belt to maintain tension in said second belt;

said flywheel has a rigid connecting arm secured thereto to rotate therewith extending radially outward from the center of rotation of said flywheel with longitudinally spaced openings; and a cable connected at one end to one of said openings and connected at its other end to said fulcrum beam second end near said counterweight means such that the point of connection of said cable can be adjusted radially with respect to the axis of rotation of said flywheel.

6. An electric powered relatively balanced pumping system according to claim 1 in which said pump cylinder is a tubular housing and said first check valve defines an upper chamber therein above said first check valve and a lower chamber below said first check valve, the side wall of said tubular housing has a longitudinal slot formed in the lower end;

said piston has an upper portion with said second check valve mounted therein which moves up and down in said lower chamber above the top of said longitudinal slot and has circumferential seals which form a reciprocating sealing relation with the interior of said tubular housing;

said short lift rod is connected to a lower portion of said piston and has a lower portion extending outwardly through said longitudinal slot and a short vertical portion extending upwardly parallel to said tubular housing and said lift wire is connected to the upper end of said short vertical portion, and said tension return spring is disposed within said tubular housing and connected at one end to said lift rod and connected at its other end to said tubular housing for returning said piston to the lower position.

7. An electric powered relatively balanced pumping system according to claim 6 in which said short lift rod vertical portion is substantially enclosed in an outer longitudinal channel member secured to the exterior of said tubular housing which extends substantially the length of said longitudinal slot.

8. An electric powered relatively balanced pumping system according to claim 1 in which said constant tension return spring having a spring tension force approximately equal to the weight of the column of fluid being lifted by said piston, and said counterweight means at said second end of said fulcrum beam is adjusted to provide a counterbalance weight of approximately 75% of the spring tension force.

9. An electric powered relatively balanced pumping system according to claim 1 in which said constant tension return spring having a spring tension force in the range of from 50% to 100% of the weight of the column of fluid being lifted by said piston, and said counterweight means at said second end of said fulcrum beam is adjusted to provide a counterbalance weight of approximately 75% of the spring tension force.

10. An electric powered relatively balanced pumping system according to claim 1 in which said flywheel is releasably connected to said fulcrum beam such that said flywheel may be disconnected and said fulcrum beam operated manually when desired.

11. In an electric powered pumping system of the type having an electric motor driven pumping unit at the ground surface with a pivotally mounted longitudinal fulcrum beam having opposed first and second ends, and a downhole fluid pump assembly submerged in a fluid beneath the ground surface including a fluid discharge conduit extending from the fluid pump assembly to the ground surface, a first check valve mounted in the fluid pump assembly for controlling fluid flow through the discharge conduit, a piston slidably mounted in the pump assembly for reciprocating movement between an upper position and a lower position with a second check valve mounted in the piston for forcing fluid through the first check valve and discharge conduit;

a thin steel lift wire connected at an upper end to the fulcrum beam first end and at a lower end to the piston in the downhole fluid pump for moving the piston to the upper position;

adjustable counterweight means connected at the fulcrum beam second end for assisting in moving the piston to the upper position;

a constant tension return spring in the fluid pump assembly operatively connected with the piston for returning the piston to the lower position;

the spring tension of said tension return spring being a predetermined percentage of the weight of the column of fluid to be lifted by the piston, and the counterweight means at the second end of the fulcrum beam being adjusted to provide a counterbalance weight of a predetermined percentage of the spring tension such that the torque forces required to be overcome by the electric motor is relatively constant and balanced through each up and down stroke of the pump cycle.

12. The electric powered pumping system according to claim 11 including
a short lift rod member exterior of the fluid pump assembly connected at a lower end with the piston in the pump assembly and at an upper end to said lift wire for lifting the piston to the upper position.

13. The electric powered pumping system according to claim 11 including
a panel of photovoltaic cells operatively connected with the electric motor for generating and supplying electrical energy to operate the motor.

14. The electric powered pumping system according to claim 11 including
a flywheel formed of concrete rotatably mounted on the electric motor driven pumping unit at the ground surface and driven by the electric motor and operatively connected with the fulcrum beam for pivoting same.

15. A downhole fluid pump assembly for use with an electric motor driven pumping unit at the ground surface of the type having a pivotally mounted longitudinal fulcrum beam with opposed first and second ends, said downhole pump assembly comprising;
a tubular pump housing having a fluid discharge port at an upper end and a fluid inlet at a lower end and a longitudinal slot formed in the side wall of the lower end;
a fluid discharge conduit connected at a lower end to said pump housing discharge port and extending to the ground surface;
a first check valve mounted between said pump housing discharge port and said discharge conduit lower end for controlling fluid flow therethrough and defining an upper chamber therein above said first check valve and a lower chamber below said first check valve;
a hollow cylindrical piston slidably mounted in said tubular pump housing for reciprocating movement relative thereto between an upper position and a lower position, said piston having an upper portion which moves up and down in said lower chamber above the top of said longitudinal slot with circumferential seal means thereon which form a reciprocating sealing relation with the interior of said pump housing;

a second check valve mounted in said piston for controlling fluid flow through said piston;

a lift rod member connected at a lower end to a lower portion of said piston and having a lower portion extending outwardly through said longitudinal slot and a short vertical portion extending upwardly parallel to said pump housing;

a thin steel lift wire connected at a lower end to said lift rod short vertical portion and adapted at an upper end for connection to one end of the fulcrum beam of the pumping unit at the ground surface for lifting said piston to the upper position on an up stroke; and a constant tension return spring disposed within said pump housing connected at one end to said lift rod and at its other end to said pump housing for returning said piston to the lower position on a down stroke and having a spring tension of a predetermined percentage of the weight of the column of fluid to be lifted by said piston;

said first check valve closing and said second check valve opening on the down stroke of said piston to allow fluid to pass through said piston into said pump cylinder and on the up stroke, said first check valve opening and said second check valve closing and the upward movement of said piston forcing the fluid in said pump cylinder through said first check valve and into said discharge conduit and on successive up strokes, the fluid being transported through said discharge conduit to the surface.

16. The downhole fluid pump assembly according to claim 15 wherein
said lift rod short vertical portion is substantially enclosed in an outer longitudinal channel member secured to the exterior of said tubular housing which extends substantially the length of said longitudinal slot.

17. A method for providing relatively balanced torque requirements for the electric drive motor in electric powered pumping systems of the type having an electric motor driven pumping unit at the ground surface with a pivotally mounted longitudinal fulcrum beam having opposed first and second ends, and a downhole fluid pump assembly submerged in a fluid beneath the ground surface including a fluid discharge conduit extending form the fluid pump assembly to the ground surface, a first check valve mounted in the fluid pump assembly for controlling fluid flow through the discharge conduit, a piston slidably mounted in the pump assembly for reciprocating movement between an upper position and a lower position with a second check valve mounted in the piston for forcing fluid through the first check valve and discharge conduit, the method comprising;
determining the weight of the fluid column to be lifted by the piston;
providing a thin steel lift wire between the fulcrum beam first end and the piston in the downhole fluid pump for lifting the piston to the upper position on an up stroke;
providing a constant tension return spring in the fluid pump assembly connected with the piston for returning the piston to the lower position on a down stroke, said tension return spring having a spring tension calculated to be a predetermined percentage of the weight of the column of fluid being lifted by the piston;

providing adjustable counterweight means at the fulcrum beam second end for assisting in lifting the piston to the upper position and adjusting said counterweight means to provide a counterbalance weight calculated to be a predetermined percentage of the spring tension of said tension return spring; such that the torque forces required to be overcome by the electric motor is relatively constant and balanced through each up and down stroke of the pump cycle.

* * * * *